United States Patent [19]

Spaw

[11] 4,170,311
[45] Oct. 9, 1979

[54] LEVEL MEASURING SYSTEM
[75] Inventor: Robert L. Spaw, Cypress, Tex.
[73] Assignee: Automatic Terminal Information Systems, Inc., Houston, Tex.
[21] Appl. No.: 870,693
[22] Filed: Jan. 19, 1978
[51] Int. Cl.² ........................................... B65G 65/76
[52] U.S. Cl. ............................... 414/289; 73/290 V; 414/296
[58] Field of Search .................... 214/17 CA; 222/56; 73/290 R, 290 V, 304 C

[56] References Cited
U.S. PATENT DOCUMENTS

| 3,807,231 | 4/1974 | Spaw | 73/290 R |
| 3,958,159 | 5/1976 | Rauchwerger | 73/304 C X |

Primary Examiner—Robert G. Sheridan
Attorney, Agent, or Firm—Michael P. Breston

[57] ABSTRACT

The level measuring system measures a variable level within a sensing area containing a mass of material. A sensing probe is positioned within the area and is coupled to the tank of an oscillating circuit through a switching network. A reference probe positioned in or near the sensing area is also coupled through the switching network to the tank of the oscillating circuit. The frequency of oscillation will depend upon a physical parameter of the mass of material within the immediate vicinity of sensing probe. Environmental conditions affecting the reactance of the sensing probe will equally affect the reference probe and therefore a change in the frequency produced by the sensing probe relative to the frequency produced by the reference probe will provide a true indication of the physical parameter being measured. Signal processing means are coupled to the oscillator for processing this frequency change. The sensing probe can be a cable antenna extending vertically into a material container for measuring the level of the material therein.

7 Claims, 4 Drawing Figures

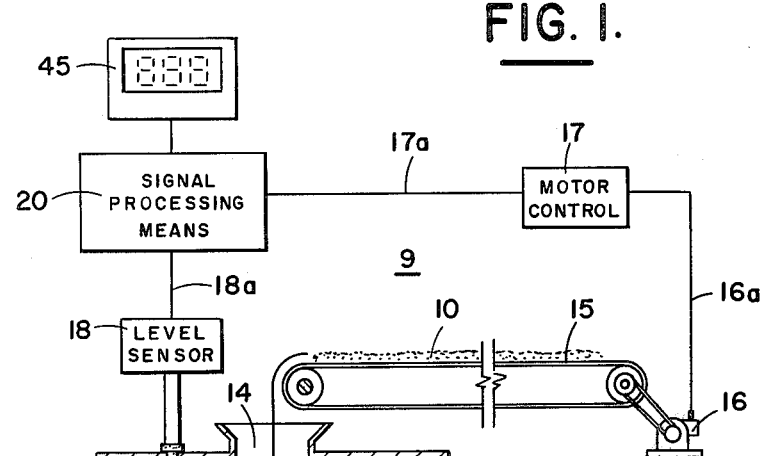
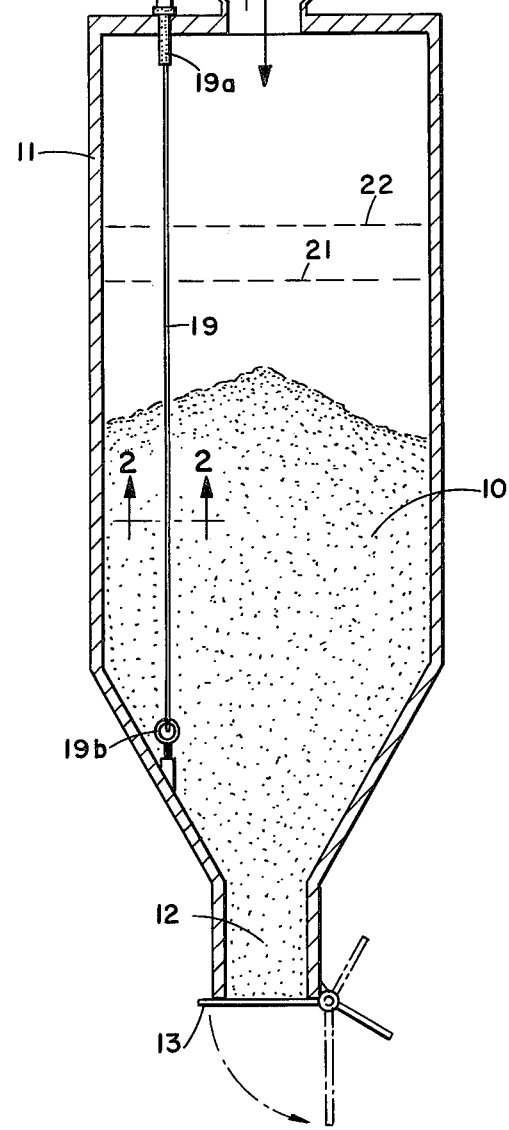
FIG. 1.
FIG. 2.

LEVEL MEASURING SYSTEM

BACKGROUND OF THE INVENTION

(1) Field of the Invention

The invention generally relates to a measuring system for measuring a physical parameter surrounding a sensing probe and having the effect of changing the probe's reactance. The invention is particularly adapted for measuring the material level in a storage container.

(2) Description of the Prior Art

A description of related art is given in applicant's U.S. Pat. No. 3,807,231 and in the references of record in that patent. The system described in my said patent requires two oscillator circuits. In the present invention the need for a second oscillator circuit has been eliminated, thereby also eliminating the need for matched components and relatively expensive circuitry.

SUMMARY OF THE INVENTION

The measuring system of the present invention automatically measures a variable level of matter present within a storage container. The system comprises a sensing probe operatively positioned within the container. The sensing probe is responsive to the changes in the quality or quantity of the matter being measured. An oscillator circuit is connected with the sensing probe through a switching network for energizing the sensing probe. The frequency of oscillation of the oscillator varies with the change in the reactance of the sensing probe and therefore with the change in the quality or quantity of the matter being monitored. A reference probe is also selectively connected through the switching means to the oscillator circuit. Electrical signal processing means process the sensing signal obtained when the sensing probe is connected to the oscillator, and then process the reference signal obtained when the reference probe is connected to the oscillator. The processing means include comparator means for comparing the thusly processed sensing and reference signals, and display means for providing a representation of the value of the quality or quantity of the matter being monitored.

In one embodiment of the invention, the processing means can include a counter for counting the frequencies of the sensing and reference signals and for providing a difference frequency count therebetween over a sample time period. The sample time is fixed and can be easily derived from a stable power line frequency. The difference frequency count can be correlated to the quality or quantity of the matter being monitored within the sensing area, and then decoded for direct digital readout.

In a modified embodiment of the invention, a fixed number of oscillations is alternately counted for both the sensing signal and the reference signal to obtain a variable time difference dependent upon the frequency difference between these signals. This variable time difference is used to provide a representation of the value of the quality or quantity of the matter being monitored within the sensing area, as well as to provide a control signal for operation of an automatic feed mechanism that maintains a predetermined desired level of the quality or quantity of the matter being monitored.

BRIEF DESCRIPTION OF THE DRAWINGS

FIG. 1 is a vertical, cross-sectional view illustrating a material container equipped with the automatic sensing and monitoring system of the present invention;

FIG. 2 is a horizontal, cross-sectional view taken along line 2—2 on FIG. 1, illustrating details of the sensing probe used in a preferred embodiment of the present invention;

DESCRIPTION OF THE PREFERRED EMBODIMENTS

Figure 3:
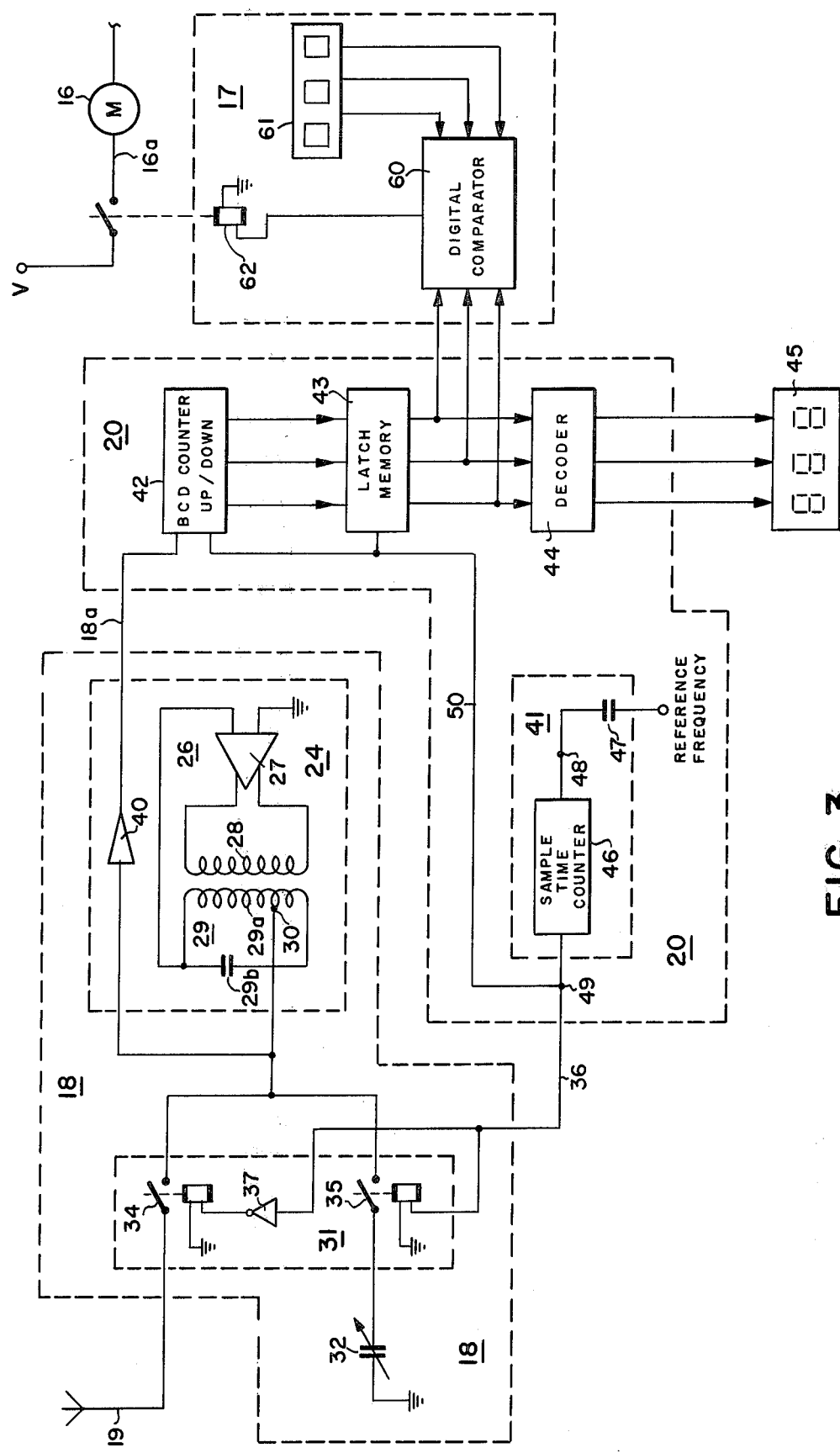
FIG. 3 is a schematic circuit diagram of one embodiment of the present invention.

Throughout the drawings, the same reference characters will be used to designate the same or similar parts.

While the invention has general applicability for sensing a quality or quantity of matter present within a sensing area, and for providing a representation of the value of the quality or quantity being monitored, it will be illustrated in connection with a measurement of the level of grain 10 within a storage bin 11. The bin is of conventional construction having a dispensing outlet 12 at its bottom end which is covered by a hinged door 13. When door 13 is moved into the open dotted line position, the grain flows out by gravity from outlet 12.

At the upper end of the bin, an automatic control system, indicated generally as 9, adds grain to the bin through a filling opening 14. System 9 includes a conveyor belt 15 driven by an electric motor 16 which in turn is controlled through a line 16a by a motor control circuit 17. The operation of control circuit 17 and of motor 16 is dependent upon the operation of a level-sensor network 18 positioned near and on top of the bin. Network 18 is electrically connected to a level-sensing probe or antenna 19 which monitors the level of grain 10 in bin 11. The probe antenna 19 is stretched vertically between insulated antenna supports 19a and 19b, connected respectively adjacent the upper and lower surfaces of the bin. The probe antenna 19 is preferably spaced from the surrounding walls of bin 11 so as to be completely surrounded by the grain material contained within the bin.

In the automatic control system 9, the electrical output signals from the level-sensing network 18 are applied on line 18a to a signal processing means 20 which produces a visible representation of the grain level in a display 45. The processing means 20 also supplies a control signal on line 17a to the motor control circuit 17 which regulates the addition of grain to the bin 11 by the conveyer belt 15.

More specifically signal processing means 20 produces a continuous, visible digital display 45 showing the level of grain within the bin 11. When the grain level falls below a predetermined minimum level indicated by the dotted line 21, a signal is transmitted from the level sensor network 18 to the motor control circuit 17 to initiate operation of the conveyer belt 15 which adds grain to the bin until the grain level rises to a desired level indicated by the dotted line 22.

FIG. 2 is a cross-section of a preferred probe antenna 19. It includes a high-density polyethylene insulating sleeve 19c surrounding a stranded, galvanized or stainless steel cable core 19d. The metal cable is sufficiently strong to resist the large forces exerted by shifting material contained with the bin, and the protective insulating sleeve 19c provides an abrasion-resistant, electrically-insulating jacket for the cable core.

One preferred embodiment of the invention is illustrated in schematic form in FIG. 3.

The level-sensing network 18 includes a transmitter 24 comprising an oscillator circuit 26 having a feedback amplifier 27 whose output is inductively coupled through a primary coil 28 to an L-C tank circuit 29 consisting of a secondary winding 29a connected in parallel to a capacitor 29b. The output terminal 30 of the tank circuit is connected through a switching network 31 to the sensing probe antenna 19 and to a reference probe which may be a variable capacitor 32. The switching network 31 includes a pair of solid state switches 34, 35 the operation of which is controlled by signals arriving on line 36 from the signal processing system 20. Line 36 is connected directly to switch 35, and is connected through an inverter 37 to switch 34.

The output terminal 30 of the oscillator is connected to an amplifier 40 which raises the power level of the signal prior to applying it to the signal processing system 20.

The signal processing system 20 includes a logic network 41, a binary-coded decimal (BCD) UP/DOWN counter 42, a latch memory 43, a decoder 44, which provides an output to the visible display 45. The logic network 41 includes a sample time counter 46 which is synchronized to a reference frequency, such as the 60 Hz power line frequency, applied through a capacitor 47 to the input 48 of counter 46. The output 49 of the counter is connected to line 36 for driving the switching network 31, and is also connected to a control line 50 for driving the UP/DOWN counter 42 and the latch memory 43.

The output of the latch memory 43 is applied to the motor control circuit 17 which includes a digital comparator 60 also receiving the output from a digital switch 61. The result of the comparison is applied to a relay 62 which controls the energization of line 16a connected to the motor 16 (FIGS. 1 and 3).

In operation of the embodiment shown in FIG. 3, the solid-state switches 34 and 35 are controlled by the sample time counter 46 and by inverter 37. When switch 34 is ON, switch 35 is OFF, and vice versa. At the same time as the switches change state, the sample time counter 46 controls the binary-coded decimal UP/DOWN counter 42 and latch memory 43.

The reactance of the sensing probe antenna 19 (FIG. 1) is altered by the changes in the level of the grain material 10 adjacent to the antenna element. The changes in the material level affect the permitivity and permeability of the spatial area into which the electromagnetic fields induced by the probe antenna's signals are radiated. Inductive coupling exists between the probe antenna 19 and the primary winding 28 through switch 34 and secondary winding 29a. Because of this inductive coupling, any change in the reactance of antenna 19 produces a change in the overall inductance-capacitance ratio of the oscillator circuit 26. This change alters the oscillator's frequency, as is well known.

The signal at the output terminal 30 of the tank circuit 29 is fed to the intput of amplifier 40 whose output is fed to the input of the BCD UP/DOWN counter 42. The reference signal produced by the transmitter 26, when the reference antenna 32 is connected to the tank circuit 29, is made to always have the higher frequency, so that when the reference antenna 32 is switched into the oscillator circuit by switch 35, counter 42 will count up, and when the probe antenna 19 is switched into the oscillator circuit by switch 34, counter 42 will count down.

The control for switches 34, 35 and for counter 42 is provided by the sample time counter 46 whose output at terminal 49 is a 50% duty cycle timing signal. This allows the sample time interval both for the reference frequency (produced with capacitor 32) and for the signal frequency (produced with probe antenna 19) to be equal. Then, since the sample times are equal, and the higher frequency of the reference signal is counted up, and the lower frequency of the probe signal is counted down, the binary coded decimal (BCD) difference count at the output of counter 42 will be proportional to the vertical level of the grain material 10 surrounding antenna probe 19.

The digital data difference count from the counter 42 is fed to the the latch memory 43 and is toggled into the memory at the clock rate produced by the sample time counter 46.

The BCD digital data difference count is fed from the latch memory 43 to decoder 44 which takes the (BCD) data and converts it to seven-segment code data that is fed to the seven-segment display 45. The seven segment data drive the individual display segments giving rise to a legible visible display of the level of the grain in bin 11.

Sample the counter 46 receives a reference timing frequency, such as a 60 Hz power line frequency, which is fed through the capacitor 47 to the input 48 of time counter 46. In this manner, time counter 46 will provide accurate frequency measurements.

The motor control circuit 17 receives from the output terminals of the latch memory 43 the difference BCD digital data count which is fed into the input terminals of the digital comparator 60. Comparator 60 compares the data from memory 43 with the BCD digital data which is stored in the BCD digital switch 61. If the data from the latch memory 43 is greater than or, equal in magnitude to, the data from switch 61, then the digital comparator 60 will send an energizing signal to relay 62 thereby energizing line 16a and motor 16, causing the conveyor 15 to supply grain to bin 11.

In adjusting the system to provide the desired measuring and conrol functions, the system is initially calibrated with the bin 11 empty. The reference variable capacitor 32 is adjusted until the antenna probe 19 produces a signal frequency which is equal to the frequency produced by antenna 32. When that happens, the readout on display 45 will be zero.

The signal generated by the oscillator 26 may have within practical limits an operating frequency which is located within the range of approximately 200 KHZ to 50 MHZ. The preferred range of operation is between 400 KHZ and 4 MHZ. The frequency shift produced by the antenna probe 19 would normally decrease by 10% compared to the reference starting frequency.

The sample time counter 46 should be set to allow the data count produced by the BCD counter 42 to be no longer than 0.1% of the range of the transmitter frequency shift. The preferred range would be a 1 MHZ reference with a 100 KHZ shift. To obtain the 0.1% count, a 0.01 second sample time would be required.

Figure 4:
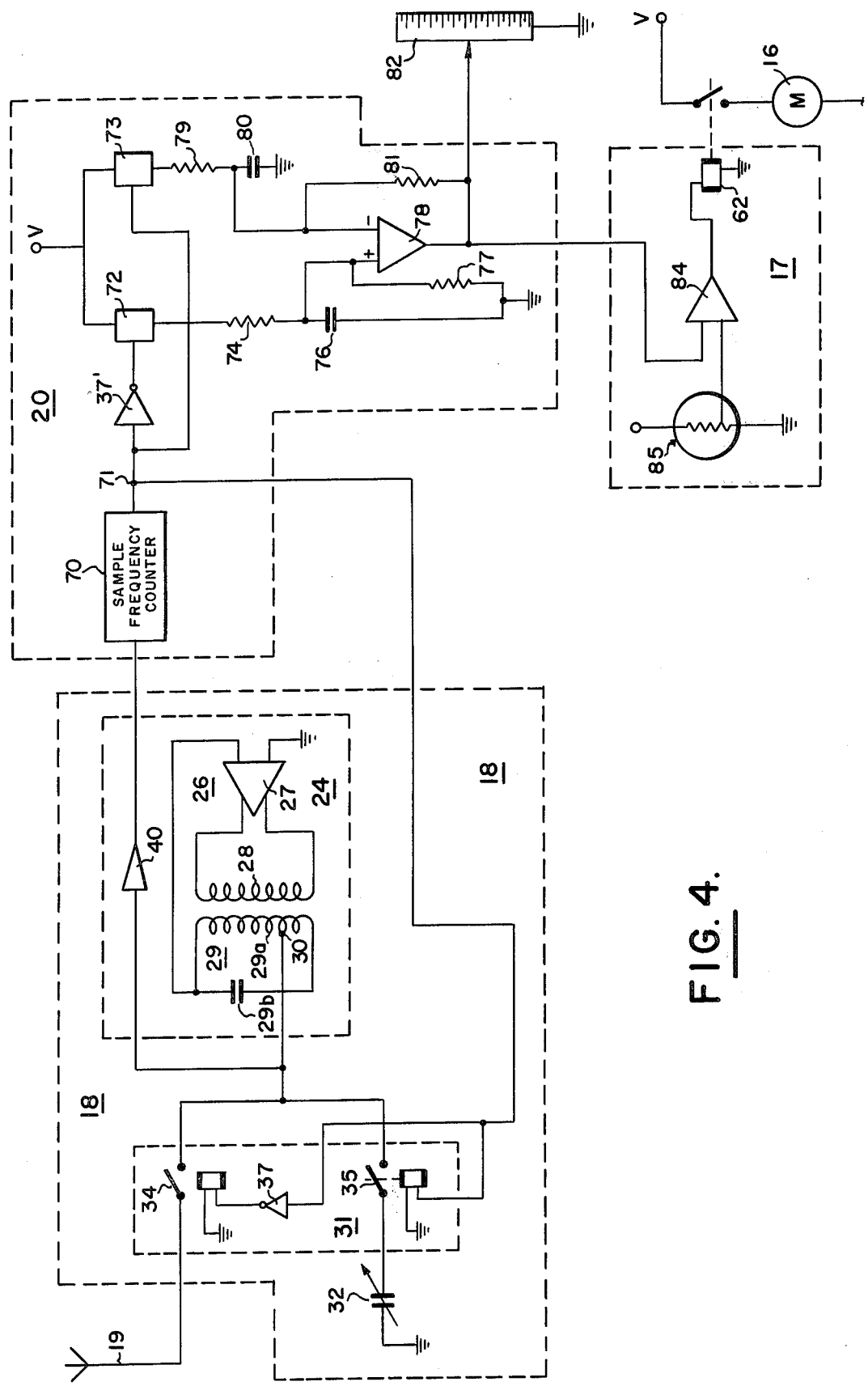
FIG. 4 is a circuit diagram of an alternate embodiment of the present invention.

FIG. 4 of the drawings illustrates a modified embodiment of the system shown in FIG. 3 which includes a means for eliminating the precision sample time counter 46 needed to compare frequencies.

The same references characters are used in FIGS. 3 and 4 to designate the same or similar parts and only the essential differences will be described. The embodiment in FIG. 4 includes a sample frequency counter 70 that counts a fixed number of cycles and then its output causes a switch from probe antenna 19 to reference antenna 32. Two sample times are generated which are equal when no frequency shift exists, i.e., no product surrounds probe 19. The two sample times are different when a frequency shift does exist, i.e., a product surrounds probe 19. The difference in time is proportional to the frequency shift and hence is a function of the level of the product around probe 19.

Amplifier 40 drives the sample frequency counter 70. Counter 70 counts to a binary multiple, such as 128, and switches its output at 71 to the opposite state. The signal from output 71 is fed back to switch 35 and to the inverter 37. The output of inverter 37 is applied to switch 34, such that when switch 35 is switched ON, switch 34 is switched OFF, and vice versa.

The output 71 of the sample frequency counter 70 also controls both switch 73 directly, and switch 72 through inverter 37′ in the same identical manner as it controls switches 34 and 35.

The solid state switches 72 and 73 are connected to a fixed reference voltage V. When switch 72 is switched ON, it connects resistor 74 to the reference voltage V. Current flowing through resistor 74 charges capacitor 76. When switch 72 is switched OFF, resistor 72 will be taken out of the circuit, and the charge on capacitor 76 will be fed through resistor 77. The voltage developed across resistor 77 appears at the positive input to a differential amplifier 78. When switch 73 is switched ON, current will flow through resistor 79 into capacitor 80. When switch 73 is switched OFF, resistor 79 will be taken out of the circuit, and a feedback resistor 81 will start conducting the charge from capacitor 80. The voltage developed across resistor 81 is fed to the negative input of the differential amplifier 78. Amplifier 78 amplifies the voltage difference, if any, and will provide an output voltage which is proportional to the sample time difference between the sample frequency obtained from the reference antenna 32 and the sample frequency obtained from the probe antenna 19.

The output of amplifier 78 is fed to an analog meter 82 for a visual display. The output signal of amplifier 78 is also fed to one input of a differential comparator 84. This output signal is compared to a reference voltage signal provided by a potentiometer 85 to the other input of comparator 84. When the incoming signal from amplifier 78 is greater or equal to the reference voltage signal from potentiometer 85, the output of comparator 84 will change states, thereby giving rise to an output signal that will energize relay 62. The energization of relay 62 applies power to motor 16 which will cause the conveyor 15 to supply grain to bin 11.

What is claimed is:

1. A measuring system for measuring a variable level of matter present within a chamber, said system comprising:
    a sensing probe operatively mounted within said chamber and being responsive to changes in the quality and/or quantity of matter being measured;
    an oscillator,
    a reference probe,
    a switching network selectively connecting said oscillator with said sensing probe and said reference probe;
    the frequency of oscillation of said oscillator varying with changes in the reactance of said sensing probe caused by the changes in the quality and/or quantity of the matter being measured;
    electrical signal processing means for processing the sensing signal produced by the oscillator when the sensing probe is connected to the oscillator and for processing the reference signal produced by the oscillator when the reference probe is connected to the oscillator; and
    means for comparing said sensing and said reference signals to obtain a measurement of said level of matter.

2. The system of claim 1 and further including display means for providing a visual representation of the value of the quality or quantity of the matter being monitored.

3. The system of claim 1 wherein said processing means include:
    a counter for counting the frequencies of said sensing signal and said reference signal, and
    means for measuring a frequency count difference therebetween over a sample time period.

4. The system of claim 1 wherein said processing means include:
    a counter for counting a fixed number of oscillations for both the sensing signal and the reference signal, and
    means for measuring a time difference corresponding to the frequency count difference.

5. In an automatic control system for controlling the level of grain within a bin, said system including a conveyor belt driven by an electric motor, a motor control circuit for controlling the energization circuit of said motor, a level-sensor network positioned near the bin and having a level-sensing antenna which monitors the level of the grain in said bin, said antenna, stretched vertically between spaced supports in said bin, being surrounded by the grain contained with the bin, said level-sensing network including a transmitter comprising an oscillator circuit having a feedback amplifier whose output is inductively coupled through a primary coil to an L-C tank circuit, said level-sensor network producing an electric output signal, a signal processing means receiving said output signal and producing a visible display of the grain level, and supplying a control signal to said motor control circuit for regulating the addition of grain to the bin by the conveyor belt, the improvement wherein:
    the output terminal of the tank circuit is connected (1) to said signal processing means and (2) through a switching network to the level-sensing antenna and to a reference probe antenna;
    said switching network including a pair of solid state switches whose operation is controlled by signals arriving from said signal processing means, and
    said signal processing means including a logic network, a binary-coded decimal (BCD) UP/DOWN counter, a latch memory, and a decoder, operatively interconnected to provide said visible display.

6. The system of claim 5 wherein said logic network includes a sample time counter which is synchronized by a reference frequency applied to the input of the sample time counter, and the output of the sample time counter drives said switching network, said UP/DOWN counter, and said latch memory.

7. The system of claim 6 wherein said motor control circuit includes a digital comparator which receives the output from a digital switch and from said latch memory, and said digital comparator provides a comparison signal for driving a relay that controls said energization circuit of said motor.

* * * * *